US011869419B2

(12) United States Patent
Pyun et al.

(10) Patent No.: US 11,869,419 B2
(45) Date of Patent: Jan. 9, 2024

(54) DISPLAY DEVICE

(71) Applicant: SAMSUNG DISPLAY CO., LTD., Yongin-si (KR)

(72) Inventors: Kihyun Pyun, Gwangmyeong-si (KR); Jang-Hoon Kwak, Cheonan-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/062,863

(22) Filed: Dec. 7, 2022

(65) Prior Publication Data

US 2023/0360588 A1 Nov. 9, 2023

(30) Foreign Application Priority Data

May 4, 2022 (KR) ........................ 10-2022-0055517

(51) Int. Cl.
*G09G 3/32* (2016.01)

(52) U.S. Cl.
CPC ........... *G09G 3/32* (2013.01); *G09G 2310/08* (2013.01); *G09G 2320/0233* (2013.01)

(58) Field of Classification Search
CPC ....... G09G 2310/08; G09G 2320/0233; G09G 3/32
See application file for complete search history.

(56) References Cited

U.S. PATENT DOCUMENTS

| | | | | |
|---|---|---|---|---|
| 11,238,774 B2 * | 2/2022 | Zeng | G09G 3/3225 | |
| 2014/0152704 A1 * | 6/2014 | Jeong | G09G 3/3233 | 345/76 |
| 2017/0236490 A1 * | 8/2017 | Cheon | G09G 5/10 | 345/691 |
| 2022/0208056 A1 * | 6/2022 | Baek | G09G 3/20 | |

FOREIGN PATENT DOCUMENTS

| | | |
|---|---|---|
| KR | 10-0606968 | 7/2006 |
| KR | 10-0706676 | 4/2007 |
| KR | 10-0737896 | 7/2007 |
| KR | 10-2016-0010687 | 1/2016 |
| KR | 10-2020-0051897 | 5/2020 |

* cited by examiner

*Primary Examiner* — Muhammad N Edun
(74) *Attorney, Agent, or Firm* — F. Chau & Associates, LLC

(57) ABSTRACT

A display device includes a first source printed circuit board connected to a control printed circuit board through a cable, a second source printed circuit board connected to the first source printed circuit board through a flexible printed circuit board, a display panel connected to the first source printed circuit board and the second source printed circuit board through a connection part, and a timing controller determining predicted power currents based on input image data, determining a target gain based on the predicted power currents and a maximum allowable power current of the flexible printed circuit board, and correcting the input image data corresponding to a gain reduction region of the display panel based on the target gain. Accordingly, the display device may reduce a power current flowing through the flexible printed circuit board and may include a flexible printed circuit board including a small number of pins.

20 Claims, 15 Drawing Sheets

DISPLAY DEVICE

CROSS-REFERENCE TO RELATED APPLICATIONS

This application claims priority under 35 U.S.C. § 119 to Korean Patent Application No. 10-2022-0055517, filed on May 4, 2022 in the Korean Intellectual Property Office, the disclosure of which is incorporated by reference in its entirety.

TECHNICAL FIELD

Embodiments of the present inventive concept relate to a display device. More particularly, embodiments of the present inventive concept relate to a display device that adjusts luminance.

DISCUSSION OF RELATED ART

Generally, a display device may include a display panel, a timing controller, a gate driver, and a data driver. The display panel may include a plurality of gate lines, a plurality of data lines, and a plurality of pixels electrically connected to the gate lines and the data lines. The gate driver may provide gate signals to the gate lines. The data driver may provide data voltages to the data lines. The timing controller may control the gate driver and the data driver.

SUMMARY

Embodiments of the present inventive concept provide a display device that reduces power current flowing through a flexible printed circuit board according to a maximum allowable power current of the flexible printed circuit board.

Embodiments of the present inventive concept also provide a display device including a flexible printed circuit board including the small number of pins.

According to embodiments of the present inventive concept, a display device includes a control printed circuit board, a first source printed circuit board connected to the control printed circuit board through a cable, a second source printed circuit board connected to the first source printed circuit board through a flexible printed circuit board, a display panel including a plurality of pixels and connected to the first source printed circuit board and the second source printed circuit board through a connection part, and a timing controller integrated in the control printed circuit board, and configured to determine predicted power currents based on input image data, to determine a target gain based on the predicted power currents and a maximum allowable power current of the flexible printed circuit board, and to correct the input image data corresponding to a gain reduction region of the display panel based on the target gain.

In an embodiment, the display panel may include first blocks connected to the first source printed circuit board and second blocks connected to the second source printed circuit board, and the timing controller may be configured to determine the predicted power currents for the second blocks based on a reference power current and block loads of the input image data corresponding to the second blocks.

In an embodiment, each of the predicted power currents for the second blocks may be determined by a product of the reference power current and each of the block loads of the input image data corresponding to the second blocks.

In an embodiment, the timing controller may calculate a reduction current by subtracting the maximum allowable power current from a maximum value among the predicted power currents for the second blocks, and the target gain may decrease as the reduction current increases.

In an embodiment, the gain reduction region may be an region disposed away from a central coordinate of the display panel based on gain reduction entry coordinates of the display panel.

In an embodiment, the timing controller may be configured to change the gain reduction region based on the predicted power currents and the maximum allowable power current.

In an embodiment, the timing controller may be configured to calculate a reduction current by subtracting the maximum allowable power current from a maximum value among the predicted power currents for the second blocks, and the gain reduction entry coordinates may become closer to the central coordinate of the display panel as the reduction current increases.

In an embodiment, the timing controller may be configured to not change the gain reduction region when the reduction current is less than a reduction current threshold, and may change the gain reduction region when the reduction current is greater than or equal to the reduction current threshold.

In an embodiment, the timing controller may be configured to correct the input image data by applying a gain to the input image data, and the gain may decrease as a coordinate to which the gain is applied in the gain reduction region is disposed away from a central coordinate of the display panel, and may converge to the target gain.

In an embodiment, the gain may be constant outside of the gain reduction region.

In an embodiment, the target gain may decrease as an amount of motion of the input image data increases.

In an embodiment, the target gain may increase as a load of the input image data increases.

According to embodiments of the present inventive concept, a display device includes a control printed circuit board, a first source printed circuit board connected to the control printed circuit board through a cable, a second source printed circuit board connected to the first source printed circuit board through a flexible printed circuit board, a display panel including a plurality of pixels and connected to the first source printed circuit board and the second source printed circuit board through a connection part, and a timing controller integrated in the control printed circuit board, and configured to determine predicted power currents based on input image data, to change a gain reduction region of the display panel based on the predicted power currents and a maximum allowable power current of the flexible printed circuit board, to determine a target gain based on an amount of motion of the input image data and a load of the input image data, and to correct the input image data corresponding to the gain reduction region based on the target gain.

In an embodiment, the gain reduction region may be a region disposed away from a central coordinate of the display panel based on gain reduction entry coordinates of the display panel.

In an embodiment, the display panel may include first blocks connected to the first source printed circuit board and second blocks connected to the second source printed circuit board, and the timing controller may be configured to determine the predicted power currents for the second blocks based on a reference power current and block loads of the input image data corresponding to the second blocks.

In an embodiment, each of the predicted power currents for the second blocks may be determined by a product of the reference power current and each of the block loads of the input image data corresponding to the second blocks.

In an embodiment, the timing controller may calculate a reduction current by subtracting the maximum allowable power current from a maximum value among the predicted power currents for the second blocks, and the gain reduction entry coordinates may become closer to the central coordinate of the display panel as the reduction current increases.

In an embodiment, the timing controller may be configured to correct the input image data by applying a gain to the input image data, and the gain may decrease as a coordinate to which the gain is applied in the gain reduction region is disposed away from a central coordinate of the display panel, and may converge to the target gain.

In an embodiment, the gain may be constant outside of the gain reduction region.

In an embodiment, the target gain may decrease as the amount of motion of the input image data increases, and the target gain may increase as the load of the input image data increases.

According to embodiments of the present inventive concept, a display device may determine a target gain according to a maximum allowable power current of a flexible printed circuit board by determining predicted power currents based on input image data, determining the target gain based on predicted power currents and the maximum allowable power current of the flexible printed circuit board, and compensating for the input image data corresponding to a gain reduction region of a display panel based on the target gain. Accordingly, the display device may reduce a power current flowing through the flexible printed circuit board and may include the flexible printed circuit board including a small number of pins.

According to embodiments of the present inventive concept, a display device may determine a target gain according to a maximum allowable power current of a flexible printed circuit board by determining predicted power currents based on input image data, changing a gain reduction region of a display panel based on the predicted power currents and the maximum allowable power current of the flexible printed circuit board, determining the target gain based on an amount of motion of the input image data and a load of the input image data, and compensating for the input image data corresponding to the gain reduction region based on the target gain. Accordingly, the display device may reduce a power current flowing through the flexible printed circuit board and may include the flexible printed circuit board including a small number of pins.

According to embodiments of the present inventive concept, a display device may reduce a size of a flexible printed circuit board by reducing the number of pins of the flexible printed circuit board. Accordingly, a manufacturing cost of the flexible printed circuit board may be reduced.

According to embodiments of the present inventive concept, the number of pins of the flexible printed circuit board may be reduced, and as a result, a yield of the flexible printed circuit board and the display device may be increased.

However, the effects of the present inventive concept are not limited to the above-described effects, and may be variously expanded without departing from the spirit and scope of the present inventive concept.

BRIEF DESCRIPTION OF THE DRAWINGS

The above and other features of the present inventive concept will become more apparent by describing in detail embodiments thereof with reference to the accompanying drawings.

DETAILED DESCRIPTION

Figure 1:
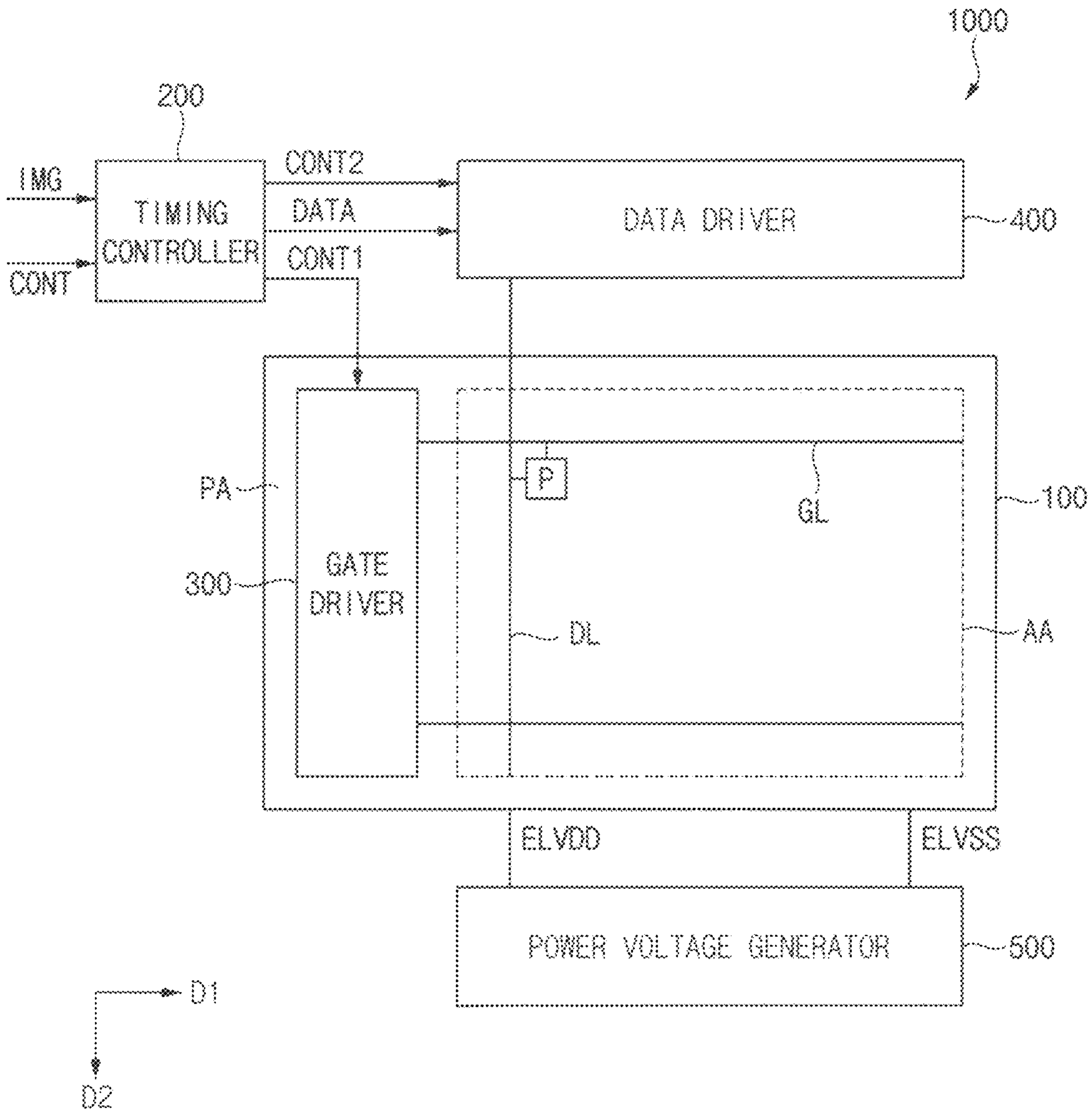
FIG. 1 is a block diagram illustrating a display device according to embodiments of the present inventive concept.

Embodiments of the present inventive concept will be described more fully hereinafter with reference to the accompanying drawings. Like reference numerals may refer to like elements throughout the accompanying drawings.

It will be understood that the terms "first," "second," "third," etc. are used herein to distinguish one element from another, and the elements are not limited by these terms. Thus, a "first" element in an embodiment may be described as a "second" element in another embodiment.

It should be understood that descriptions of features or aspects within each embodiment should typically be considered as available for other similar features or aspects in other embodiments, unless the context clearly indicates otherwise.

As used herein, the singular forms "a", "an" and "the" are intended to include the plural forms as well, unless the context clearly indicates otherwise.

FIG. 1 is a block diagram illustrating a display device 1000 according to embodiments of the present inventive concept.

Referring to FIG. 1, in an embodiment, the display device 1000 includes a display panel 100, a timing controller 200, a gate driver 300, a data driver 400, and a power voltage generator 500. In an embodiment, the timing controller 200 and the data driver 400 may be integrated into one chip.

The display panel 100 has a display region AA in which an image is displayed and a peripheral region PA adjacent to the display region AA. In an embodiment, the gate driver 300 may be mounted on the peripheral region PA of the display panel 100.

The display panel 100 may include a plurality of gate lines GL, a plurality of data lines DL, and a plurality of pixels P electrically connected to the data lines DL and the gate lines GL. The gate lines GL may extend in a first direction D1 and be spaced apart from each other in a second direction D2, and the data lines DL may extend in the second direction D2 crossing the first direction D1 and be spaced apart from each other in the first direction D1.

The timing controller 200 may receive input image data IMG and an input control signal CONT from a host processor (e.g., a graphic processing unit (GPU)). For example, the input image data IMG may include red image data, green image data and blue image data. In an embodiment, the input image data IMG may further include white image data. In an embodiment, the input image data IMG may include magenta image data, yellow image data, and cyan image data. The input control signal CONT may include a master clock signal and a data enable signal. The input control signal CONT may further include a vertical synchronizing signal and a horizontal synchronizing signal.

The timing controller 200 may generate a first control signal CONT1, a second control signal CONT2, and data signal DATA based on the input image data IMG and the input control signal CONT.

The timing controller 200 may generate the first control signal CONT1, which controls operation of the gate driver 300, based on the input control signal CONT and output the first control signal CONT1 to the gate driver 300. The first control signal CONT1 may include a vertical start signal and a gate clock signal.

The timing controller 200 may generate the second control signal CONT2, which controls operation of the data driver 400, based on the input control signal CONT, and output the second control signal CONT2 to the data driver 400. The second control signal CONT2 may include a horizontal start signal and a load signal.

The timing controller 200 may receive the input image data IMG and the input control signal CONT, and generate the data signal DATA. The timing controller 200 may output the data signal DATA to the data driver 400.

The gate driver 300 may generate gate signals, which drive the gate lines GL, in response to the first control signal CONT1 input from the timing controller 200. The gate driver 300 may output the gate signals to the gate lines GL. For example, the gate driver 300 may sequentially output the gate signals to the gate lines GL.

The data driver 400 may receive the second control signal CONT2 and the data signal DATA from the timing controller 200. The data driver 400 may convert the data signal DATA into data voltages having an analog type. The data driver 400 may output the data voltage to the data lines DL.

The power voltage generator 500 may generate a power voltage and apply the power voltage to the display panel 100. For example, the power voltage generator 500 may apply a first power voltage ELVDD and a second power voltage ELVSS to the pixel P including the light emitting element to the display panel 100. For example, the first power voltage ELVDD may be a relatively high power voltage, and the second power voltage ELVSS may be a relatively low power voltage.

Figure 2:
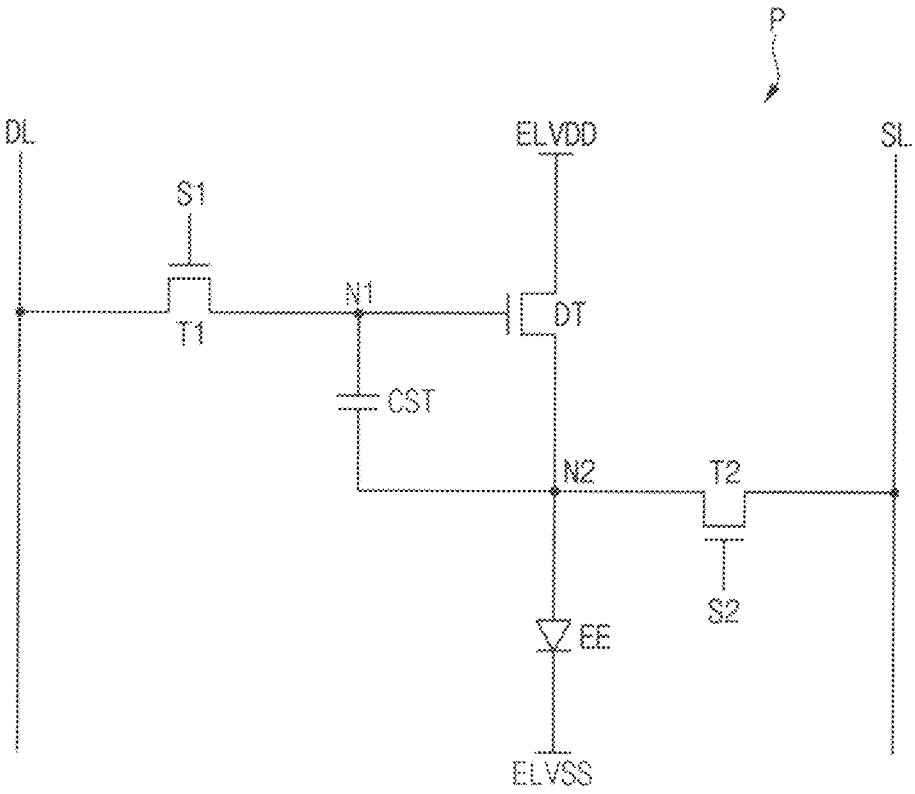
FIG. 2 is a circuit diagram illustrating an example of a pixel of the display device of FIG. 1.

FIG. 2 is a circuit diagram illustrating an example of the pixel P of the display device 1000 of FIG. 1.

Referring to FIG. 2, The pixel P may include a first switching transistor T1 including a control electrode receiving the first gate signal S1, a first electrode connected to the data line DL, and a second electrode connected to the first node N1, a storage capacitor CST including a first electrode connected to the first node N1 and a second electrode connected to the second node N2, a driving transistor DT including a control electrode connected to the first node N1, a first electrode receiving the first power voltage ELVDD, and a second electrode connected to the second node N2, a second switching transistor T2 including a control electrode receiving a second gate signal S2, a first electrode connected to the second node N2, and a second electrode connected to a sensing line SL, the light emitting element EE including an anode electrode connected to the second node N2, and a cathode receiving the second power voltage ELVSS. In an embodiment, the display panel 100 may include a plurality of the sensing lines SL, and the pixels P may be electrically connected to the sensing lines SL.

As shown in FIG. 2, the first switching transistor T1, the driving transistor DT, and the second switching transistor T2 may be n-type transistors. However, the pixel P according to embodiments of the present inventive concept is not limited thereto. For example, the first switching transistor T1, the driving transistor DT, and the second switching transistor T2 may be p-type transistors according to some embodiments.

For example, the first gate signal S1 and the second gate signal S2 may have an activation level, the data voltage may be applied to the first node N1, and an initialization voltage may be applied to the second node N2 (e.g., data write operation). And, the first gate signal S1 and the second gate signal S2 may have a deactivation level, and a power current (e.g., a driving current) corresponding to a voltage of the control electrode (e.g., the first node N1) of the driving transistor DT may be applied to the light emitting element EE (e.g., light emitting operation).

In an embodiment, the first gate signal S1 and the second gate signal S2 may have the activation level, a reference voltage may be applied to the first node N1, and the initialization voltage may be applied to the second node N2. The first gate signal S1 has the deactivation level, and the second gate signal S2 may have the activation level, and a power current (e.g., a driving current) corresponding to a voltage of the control electrode (e.g., the first node N1) of the driving transistor DT may be applied to the data driver 400 through the sensing line SL (e.g., sensing operation). The data driver 400 may generate sensing data corresponding to a current value applied through the sensing line SL and apply the sensing data to the timing controller 200. The timing controller 200 may correct the input image data IMG based on the sensing data.

Figure 3:
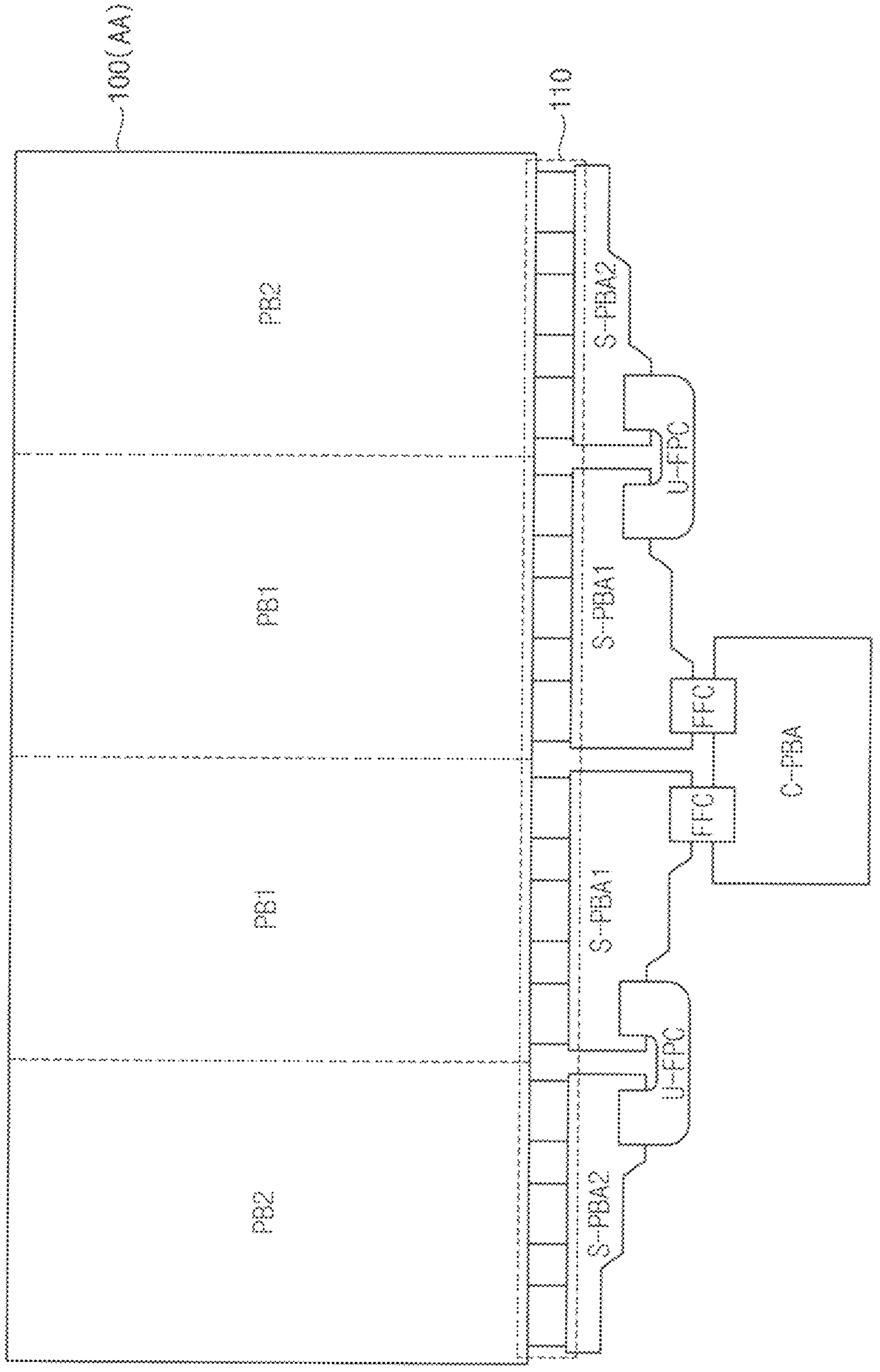
FIG. 3 is a plan view illustrating a part of the display device of FIG. 1 according to embodiments of the present inventive concept.
Figure 4:
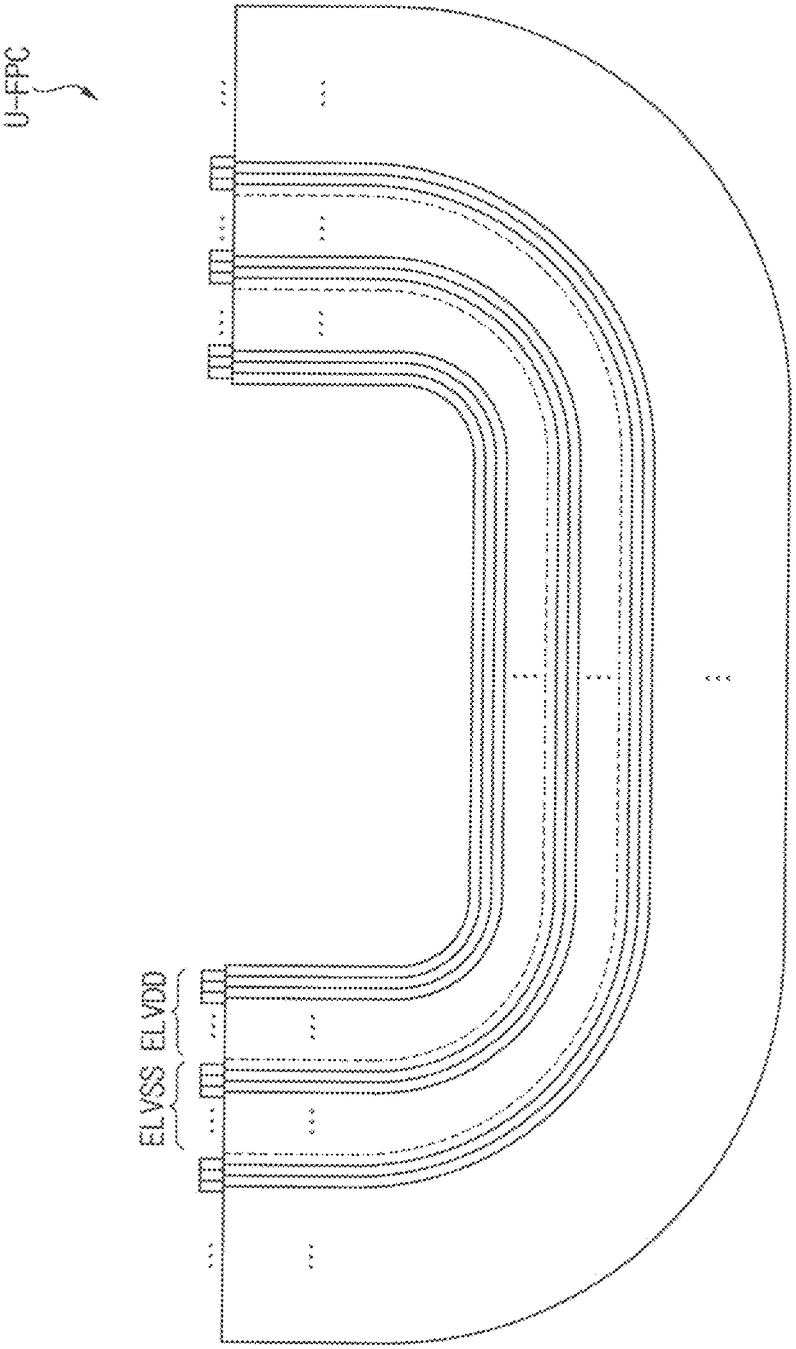
FIG. 4 is a diagram illustrating a flexible printed circuit board of the display device of FIG. 1 according to embodiments of the present inventive concept.

FIG. 3 is a plan view illustrating a part of the display device 1000 of FIG. 1 according to embodiments of the present inventive concept. FIG. 4 is a diagram illustrating a flexible printed circuit board U-FPC of the display device 1000 of FIG. 1 according to embodiments of the present inventive concept.

Referring to FIGS. 1, 3, and 4, the display device 1000 may include a control printed circuit board C-PBA, a first source printed circuit board S-PBA1 connected to the control printed circuit board C-PBA through a cable FFC, a second source printed circuit board S-PBA2 connected to the first source printed circuit board S-PBA1 through a flexible printed circuit board U-FPC, the display panel 100 including the pixels P and connected to the first source printed circuit board S-PBA1 and the second source printed circuit board S-PBA2 through a connection part 110, and the timing controller 200 integrated in the control printed circuit board C-PBA.

The control printed circuit board C-PBA may include the timing controller 200 and the power voltage generator 500.

For example, the timing controller 200 and the power voltage generator 500 may be integrated on the control printed circuit board C-PBA.

The cable FFC may apply an electrical signal to the first source printed circuit board S-PBA1. For example, the electrical signal applied through the cable FFC may be the first power voltage ELVDD, the second power voltage ELVSS, and/or a signal (e.g., the data signal DATA, the first control signal CONT1, and/or the second control signal CONT2) according to an interface (e.g., Unified Standard Interface for TV (USI-T)).

The first source printed circuit board S-PBA1 and the second source printed circuit board S-PBA2 may include the data driver 400. In an embodiment, the first source printed circuit board S-PBA1 and the second source printed circuit board S-PBA2 may include the gate driver 300.

The connection part 110 may connect the first source printed circuit board S-PBA1 and the second source printed circuit board S-PBA2 to the display panel 100. In an embodiment, the connection part 110 may include the data line DL. In an embodiment, the connection part 110 may include the data line DL and the gate line GL.

As shown in FIG. 4, the flexible printed circuit board U-FPC may include a plurality of pins. Each of the pins may apply a predetermined electrical signal from the first source printed circuit board S-PBA1 to the second source printed circuit board S-PBA2. Some of the pins may apply the first power voltage ELVDD, other pins may apply the second power voltage ELVSS, and other pins may apply electrical signals other than the first power voltage ELVDD and the second power voltage ELVSS (e.g., the data voltage).

The power current may flow through the pins transmitting the first power voltage ELVDD and the second power voltage ELVSS. As the number of pins transmitting the first power voltage ELVDD and the second power voltage ELVSS increases, a high power current may flow through the flexible printed circuit board U-FPC. However, since a size of the flexible printed circuit board U-FPC increases as the number of pins increases, it may be desirable for the display device 1000 to adjust the power current applied to the display panel 100 through the second source printed circuit board S-PBA2.

The first blocks PB1 and the second blocks PB2 illustrated in FIG. 3 will be described below.

Figure 5:
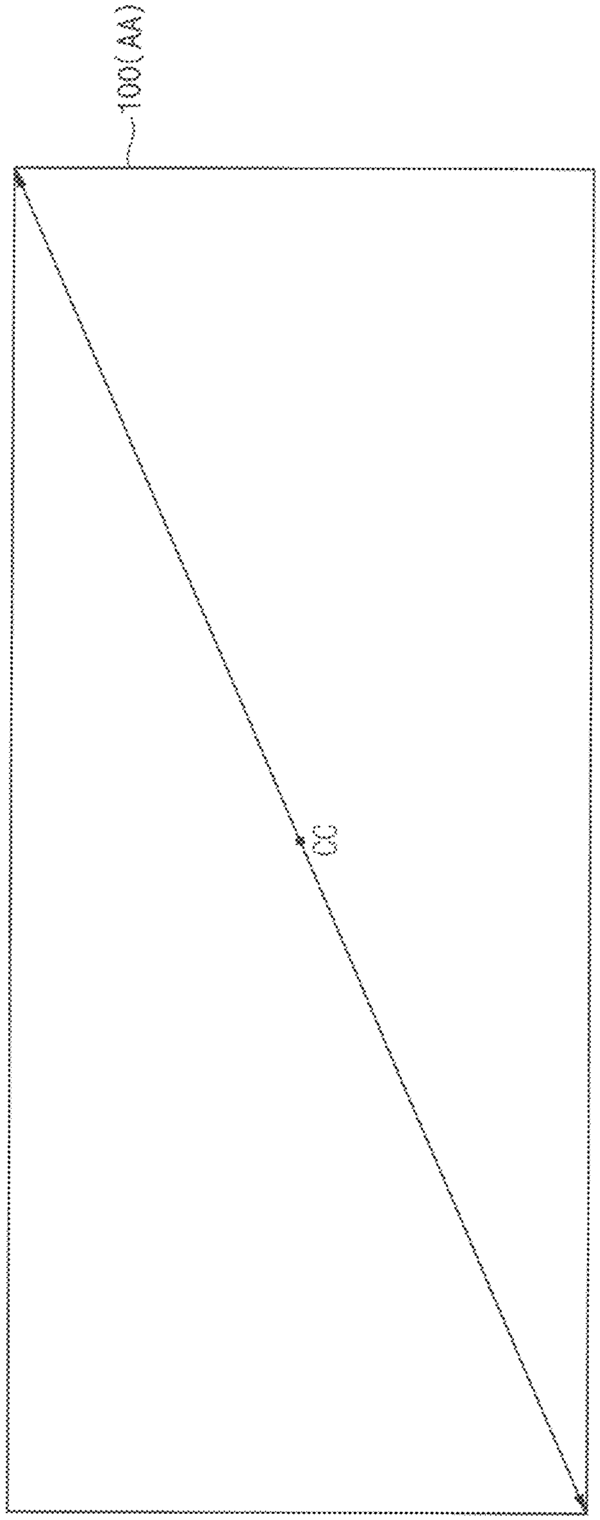
FIGS. 5 and 6 are diagrams illustrating that the display device of FIG. 1 determines a gain according to embodiments of the present inventive concept.
Figure 6:
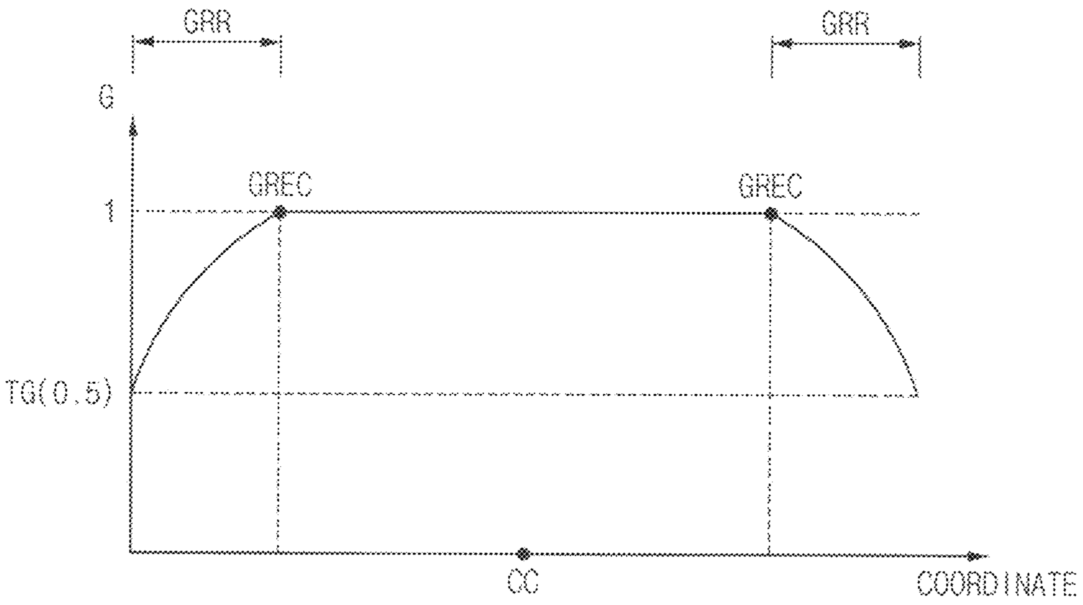

FIGS. 5 and 6 are diagrams illustrating that the display device 1000 of FIG. 1 determines a gain G according to embodiments of the present inventive concept. FIG. 6 illustrates the gain G on a line passing through a center coordinate CC of the display panel 100 of FIG. 5.

Referring to FIGS. 1, 5, and 6, the timing controller 200 may correct the input image data IMG by applying the gain G to the input image data IMG.

The timing controller 200 may apply the gain G between 0 and 1 to the input image data IMG. For example, when the gain G of 1 is applied, a grayscale value of the input image data IMG may not be changed. For example, when the gain G of 0 is applied, the grayscale value of the input image data IMG may be changed to 0. For example, the gain G may be multiplied by the grayscale value of the input image data IMG. In an embodiment, the gain G may be multiplied by a luminance value of the input image data IMG (e.g., a luminance value in the luminance domain). Accordingly, as the gain G decreases, the grayscale value (or luminance) of the input image data IMG may decrease.

The gain G may decrease as a coordinate to which the gain G is applied in a gain reduction region GRR is disposed away from a central coordinate CC of the display panel 100, and may converge to a target gain TG. As the target gain TG is smaller, the gain G in the gain reduction region GRR may be smaller. Accordingly, as the target gain TG decreases, an image displayed in the gain reduction region GRR may become darker.

In an embodiment, the gain G may be constant outside of the gain reduction region GRR. The gain G may have a maximum value outside of the gain reduction region GRR. Accordingly, the display device 1000 may display an image brighter than the gain reduction region GRR outside of the gain reduction region GRR.

For example, the gain G may be 1 outside of the gain reduction region GRR. When the target gain TG is 0.5, the gain G may decrease as a distance from the central coordinate CC in the gain reduction region GRR increases, and the gain G applied to a coordinate farthest from the central coordinate CC may be 0.5.

For example, the gain reduction region GRR may be determined as a corner portion of the display region AA. For example, the gain reduction region GRR may be determined as a corner of the display region AA. Accordingly, the display device 1000 may prevent or reduce an afterimage caused by an image or text fixedly viewed at the corner of the display region AA. That is, the display device 1000 may darken the image displayed in the gain reduction region GRR by applying the gain G to prevent or reduce the afterimage. Thus, the afterimage may be less visible or may be not visible according to embodiments of the present inventive concept.

Figure 7:
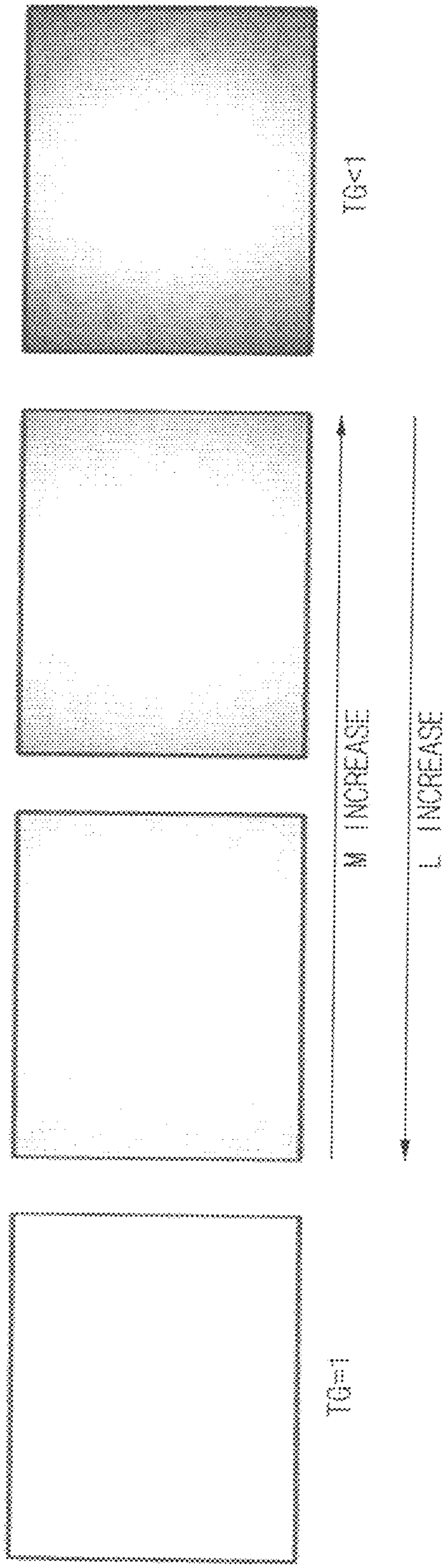
FIGS. 7 to 9 are diagrams illustrating an example in which the display device of FIG. 1 determines a target gain according to an amount of motion and a load according to embodiments of the present inventive concept.
Figure 8:
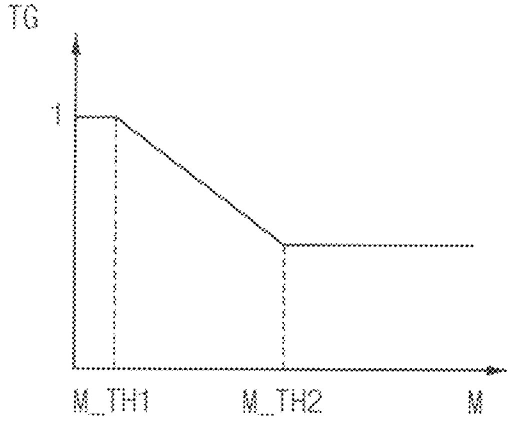
Figure 9:
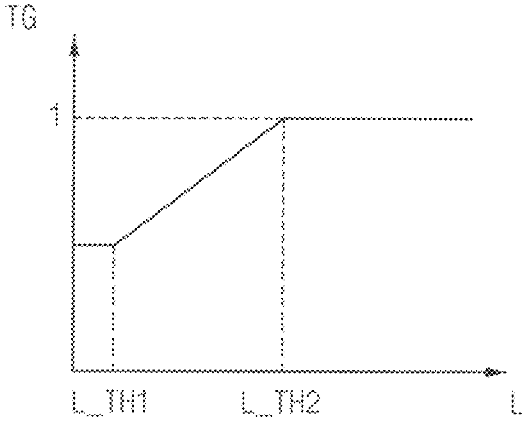

FIGS. 7 to 9 are diagrams illustrating an example in which the display device 1000 of FIG. 1 determines the target gain TG according to an amount of motion M and a load L according to embodiments of the present inventive concept.

Referring to FIGS. 1 and 6 to 8, the timing controller 200 may determine the target gain TG based on the amount of motion M of the input image data IMG and the load L of the input image data IMG.

The target gain TG may decrease as the amount of motion M of the input image data IMG increases. In an embodiment, when the amount of motion M has a value equal to or less than a first motion threshold M_TH1, the target gain TG may be set to a maximum value. In an embodiment, when the amount of motion M has a value between the first motion threshold M_TH1 and a second motion threshold M_TH2, the target gain TG may be gradually decreased from 1. In an embodiment, when the amount of motion M has a value equal to or greater than the second motion threshold M_TH2, the target gain TG may converge to a predetermined value. The first motion threshold hold M_TH1 and the second motion threshold hold M_TH2 may be values set by a user.

The motion amount M of the input image data IMG of a current frame may be a sum of a difference between the input image data IMG of a previous frame and the input image data IMG of the current frame. In an embodiment, the motion amount M of the input image data IMG of the current frame may be a sum of differences between the grayscale values of the input image data IMG of the previous frame and the grayscale values of the input image data IMG of the current frame. In an embodiment, the motion amount M of the input image data IMG of the current frame may be a difference between a sum of the grayscale values of the input image data IMG of the previous frame and a sum of the grayscale values of the input image data IMG of the current frame.

When the motion of the image is large, attention may be focused on the motion. Accordingly, even when the small gain G is applied, a darkening of the corner may not be visually recognized. Conversely, when the motion of the image is small, the darkening of the corner may be relatively more recognizable than when the motion of the image is large. Accordingly, it may be desirable for the display device 1000 to apply the larger gain G when the motion of the image is small compared to when the motion of the image is large.

Referring to FIGS. 1, 6, 7, and 9, the target gain TG may increase as the load L of the input image data IMG increases. In an embodiment, when the load L has a value equal to or less than a first load threshold L_TH1, the target gain TG may converge to a predetermined value. In an embodiment, when the load L has a value between the first load threshold L_TH1 and a second load threshold L_TH2, the target gain TG may increase from the predetermined value. In an embodiment, when the load L has a value equal to or greater than the second load threshold L_TH2, the target gain TG may be set to a maximum value. The first load threshold hold L_TH1 and the second load threshold hold L_TH2 may be values set by a user.

The load L of the input image data IMG may be normalized to have a value ranging from 0% to 100%. For example, when the input image data IMG is a full white image, the load L may be 100%. For example, when the input image data IMG is a full black image, the load L may be 0%.

When the load L is small (e.g., when the luminance is small), the darkening of the corner may be relatively less visible than when the load L is large. Accordingly, it may be desirable for the display device 1000 to apply the smaller gain G when the load L is small compared to when the load L is large.

When the target gain TG is too low, a difference in luminance between a center portion and the corner portion of the display panel 100 increases. Therefore, it may be desirable for the target gain TG to converge to a predetermined value.

Although the maximum value of the target gain TG is described as having a value of 1, this is an example, and embodiments of the inventive concept are not limited thereto. For example, the target gain TG may have a value less than 1 according to some embodiments.

Although the target gain TG is illustrated as changing with a constant slope according to a section, this is an example, and embodiments of the inventive concept are not limited thereto. For example, in an embodiment, the target gain TG may change in a curved shape according to a section. In an embodiment, the target gain TG may be changed in a step-like manner according to a section. In an embodiment, the target gain TG may change with a constant slope in all periods.

Figure 10:
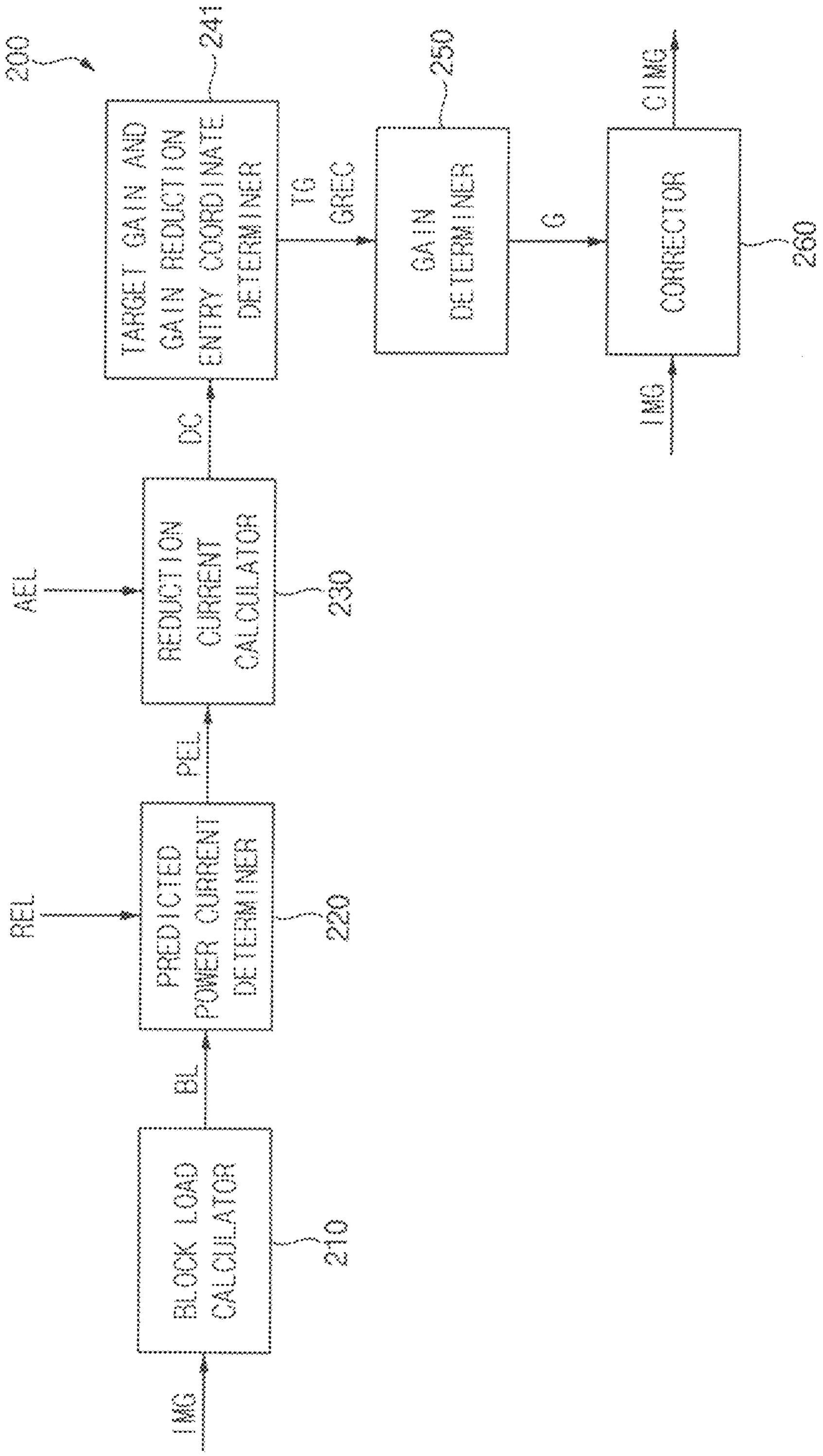
FIG. 10 is a block diagram illustrating an example of a timing controller of the display device of FIG. 1.
Figure 11:
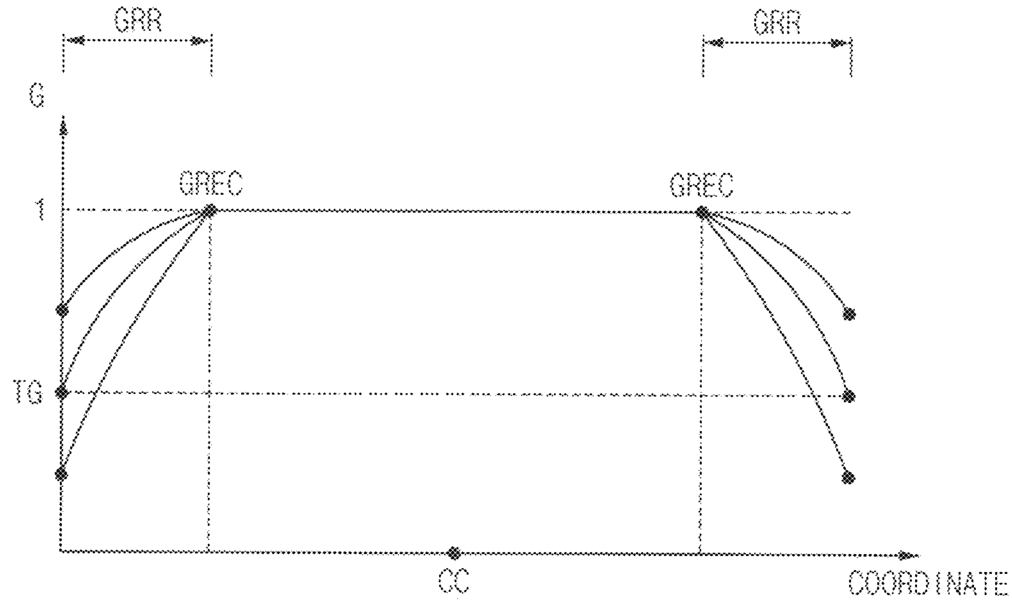
FIG. 11 is a graph illustrating an example in which the display device of FIG. 1 determines a target gain.
Figure 12:
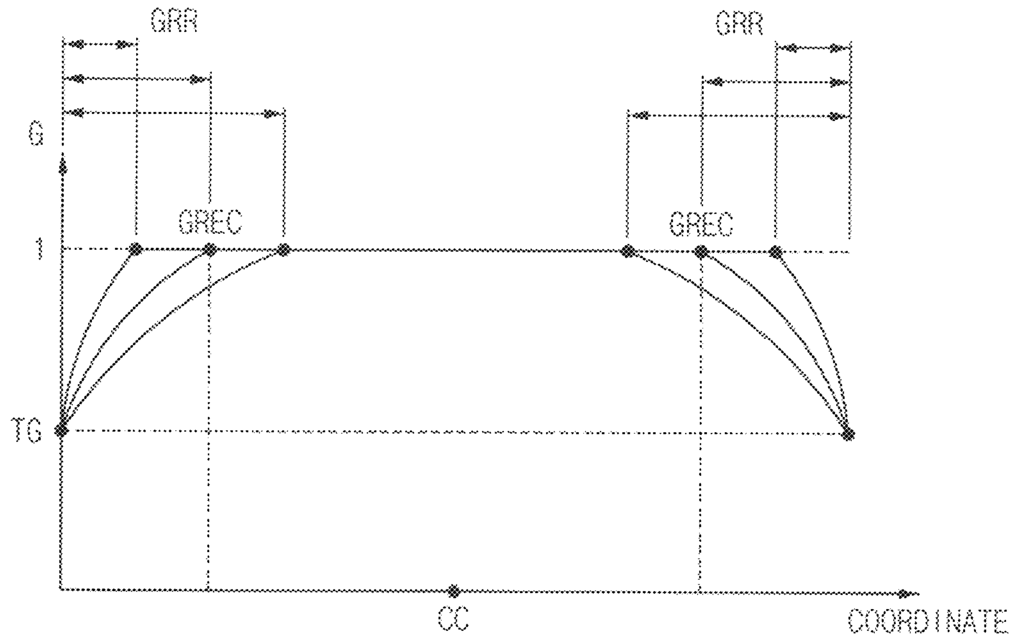
FIG. 12 is a graph illustrating an example in which the display device of FIG. 1 determines a gain reduction entry coordinate.

FIG. 10 is a block diagram illustrating an example of the timing controller 200 of the display device 1000 of FIG. 1. FIG. 11 is a graph illustrating an example in which the display device 1000 of FIG. 1 determines the target gain TG. FIG. 12 is a graph illustrating an example in which the display device 1000 of FIG. 1 determines a gain reduction entry coordinate GREC.

Referring to FIGS. 1, 3, and 10, the timing controller 200 may determine predicted power currents PEL based on the input image data IMG, determine the target gain TG based on the predicted power currents PEL and a maximum allowable power current AEL of the flexible printed circuit board U-FPC, and correct the input image data IMG corresponding to the gain reduction region GRR of the display panel 100 based on the target gain TG.

The timing controller 200 may include a block load calculator 210, a predicted power current determiner 220, a reduction current calculator 230, a target gain and gain reduction entry coordinate determiner 241, a gain determiner 250, and a corrector 260.

The display panel 100 may include first blocks PB1 connected to the first source printed circuit board S-PBA1 and second blocks PB2 connected to the second source printed circuit board S-PBA2. Accordingly, the power current applied to the first blocks PB1 may not flow through the flexible printed circuit board U-FPC, and the power current applied to the second blocks PB2 may flow through the flexible printed circuit board U-FPC.

The block load calculator 210 may calculate block loads BL of the input image data IMG corresponding to the second blocks PB2. For example, the block loads BL of the input image data IMG corresponding to the second blocks PB2 may be loads L of the input image data IMG for displaying an image in the second blocks PB2. For example, as shown in FIG. 3, when each of the second blocks PB2 occupies 25% of the display region AA and the input image data IMG displays the full white image, each of the block loads BL of the input image data IMG corresponding to the second blocks PB2 may be 25%.

The predicted power current determiner 220 may determine the predicted power currents PEL for the second blocks PB2 based on a reference power current REL and the block loads BL of the input image data IMG corresponding to the second blocks PB2. The reference power current REL may be a value of the power current used to display the input image data IMG of the specific load L. That is, the reference power current REL may be an experimentally determined value. The predicted power currents PEL for the second blocks PB2 may be predicted values of the power currents to be applied to the second blocks PB2 calculated using the block loads BL.

For example, the reference power current REL may be a value of the power current used to display the input image data IMG of the load L of 1%. Each of the predicted power currents PEL for the second blocks PB2 may be determined by a product of the reference power current REL and each of the block loads BL of the input image data IMG corresponding to the second blocks PB2.

The reduction current calculator may calculate a reduction current DC by subtracting the maximum allowable power current AEL from a maximum value among the predicted power currents PEL for the second blocks PB2. For example, when the predicted power current PEL for the leftmost second block PB2 of FIG. 3 is 5 A, the predicted power current PEL for the rightmost second block PB2 of FIG. 3 is 6 A, and the maximum allowable power current AEL is 5 A, the reduction current DC may be 6−5=1 A.

The maximum allowable power current AEL may be a current value that can flow to the maximum in the flexible printed circuit board U-FPC. For example, as the number of pins for applying the power voltage (e.g., the first power voltage ELVDD and the second power voltage ELVDD) of the flexible printed circuit board U-FPC increases, the maximum allowable power current AEL may be large.

When target gains TG in both directions based on the center coordinate CC are different, an image with non-uniform luminance may be displayed. In addition, to prevent or reduce the power current greater than the maximum allowable power current AEL from flowing in the flexible printed circuit board U-FPC, the maximum value among the predicted power currents PEL for the second blocks PB2 may be used.

The target gain and gain reduction entry coordinate determiner 241 may determine the target gain TG based on the reduction current DC. For example, as shown in FIG. 11, the target gain TG may decrease as the reduction current DC increases.

When the reduction current DC is large, the power currents greater than the maximum allowable power current AEL may be applied to the second blocks PB2. Accordingly, it may be desirable to decrease the target gain TG as the reduction current DC increases.

The target gain and gain reduction entry coordinate determiner 241 may change the gain reduction region GRR based on the reduction current DC. For example, as shown in FIG. 12, the gain reduction entry coordinates GREC may become closer to the center coordinate CC of the display panel 100 as the reduction current DC increases.

The gain reduction region GRR may be a region disposed away from the central coordinate CC of the display panel 100 based on the gain reduction entry coordinates GREC of the display panel 100. Accordingly, the gain reduction region GRR may be located at the corner portion.

When the reduction current DC is large, the power currents greater than the maximum allowable power current AEL may be applied to the second blocks PB2. Since the gain G converges to the target gain TG, the closer the gain reduction entry coordinates GREC are to the central coordinate CC, the smaller a sum of the power currents applied to the second blocks PB2. Accordingly, it may be desirable to move the gain reduction entry coordinates GREC closer to the center coordinate CC as the reduction current DC increases.

The gain determiner 250 may determine the gain G according to the target gain TG, the gain reduction entry coordinates GREC, and a coordinate to which the gain G is applied. For example, the gain G may be determined as shown in FIGS. 11 and 12.

The corrector 260 may generate a corrected input image data CIMG by applying the determined gain G to the input image data IMG. The timing controller 200 may generate the data signal DATA based on the corrected input image data CIMG.

FIGS. 1 to 12 illustrate that both the target gain TG and the gain reduction entry coordinate GREC are adjusted, but embodiments of the present inventive concept are not limited thereto. For example, the display device 1000 may adjust the target gain TG or the gain reduction entry coordinate GREC according to some embodiments.

Figure 13:
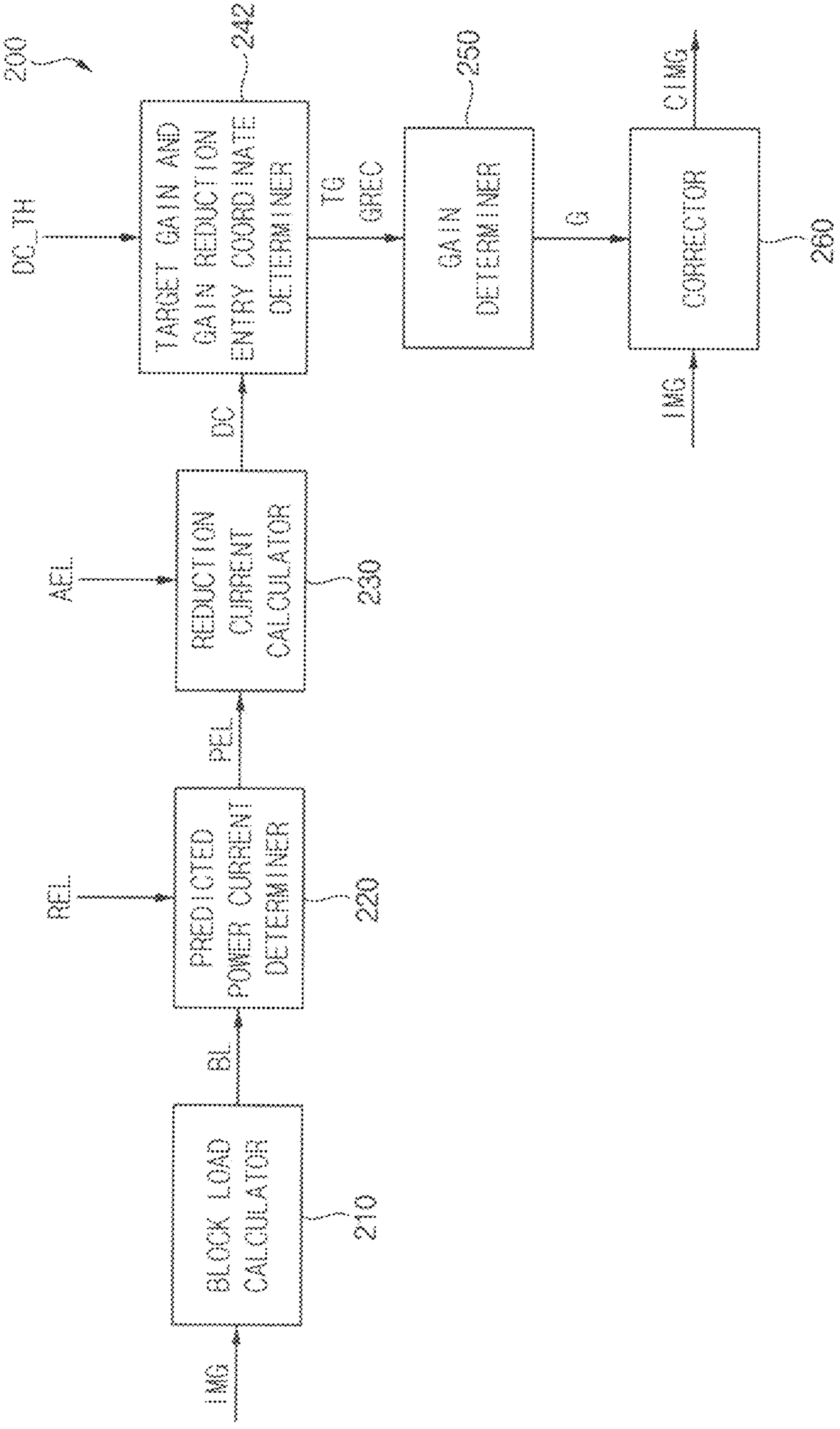
FIG. 13 is a block diagram illustrating an example of a timing controller of a display device according to embodiments of the present inventive concept.
Figure 14A:
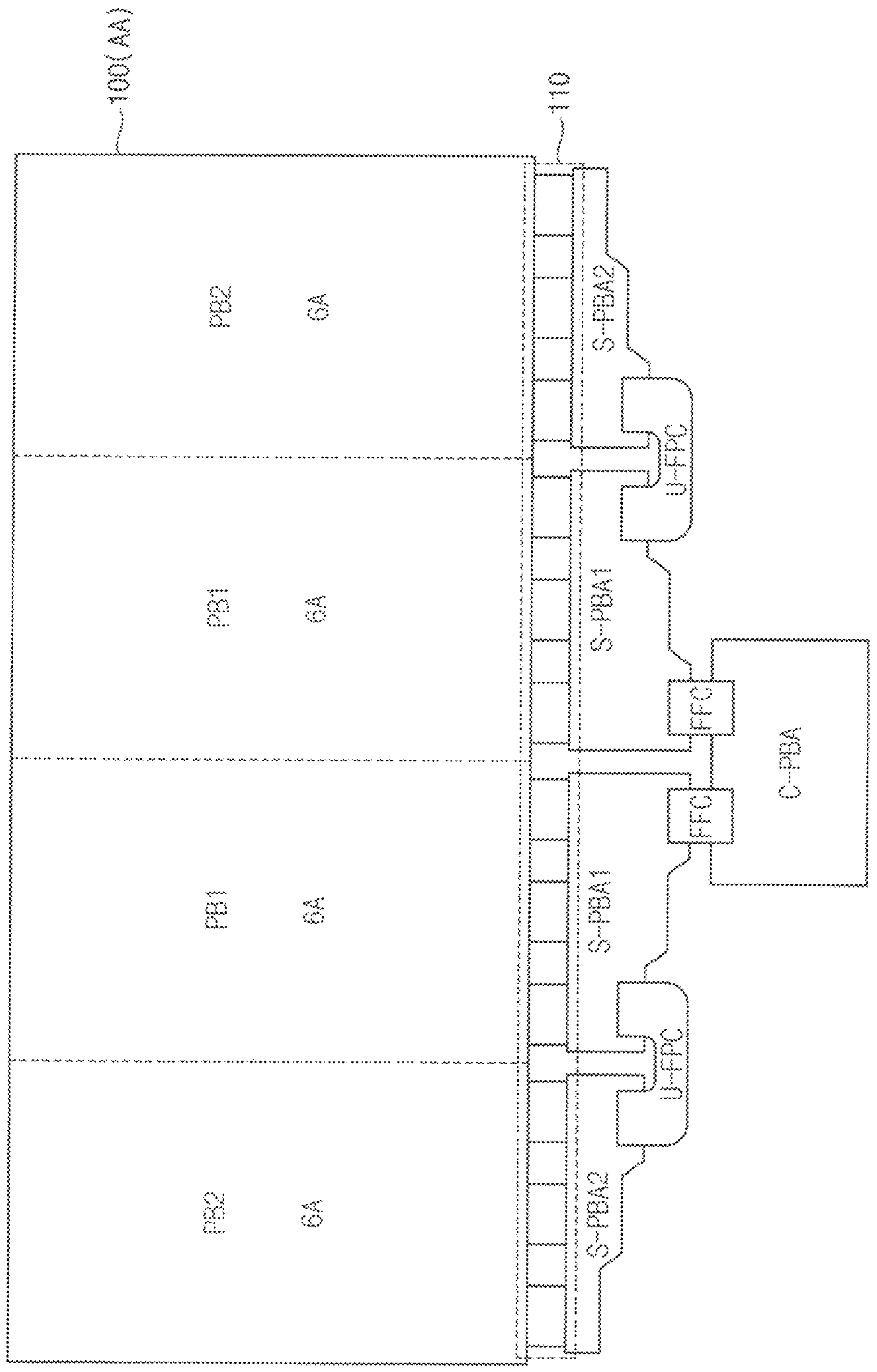
FIGS. 14A to 14C are diagrams illustrating an example in which the display device of FIG. 13 corrects input image data.
Figure 14B:
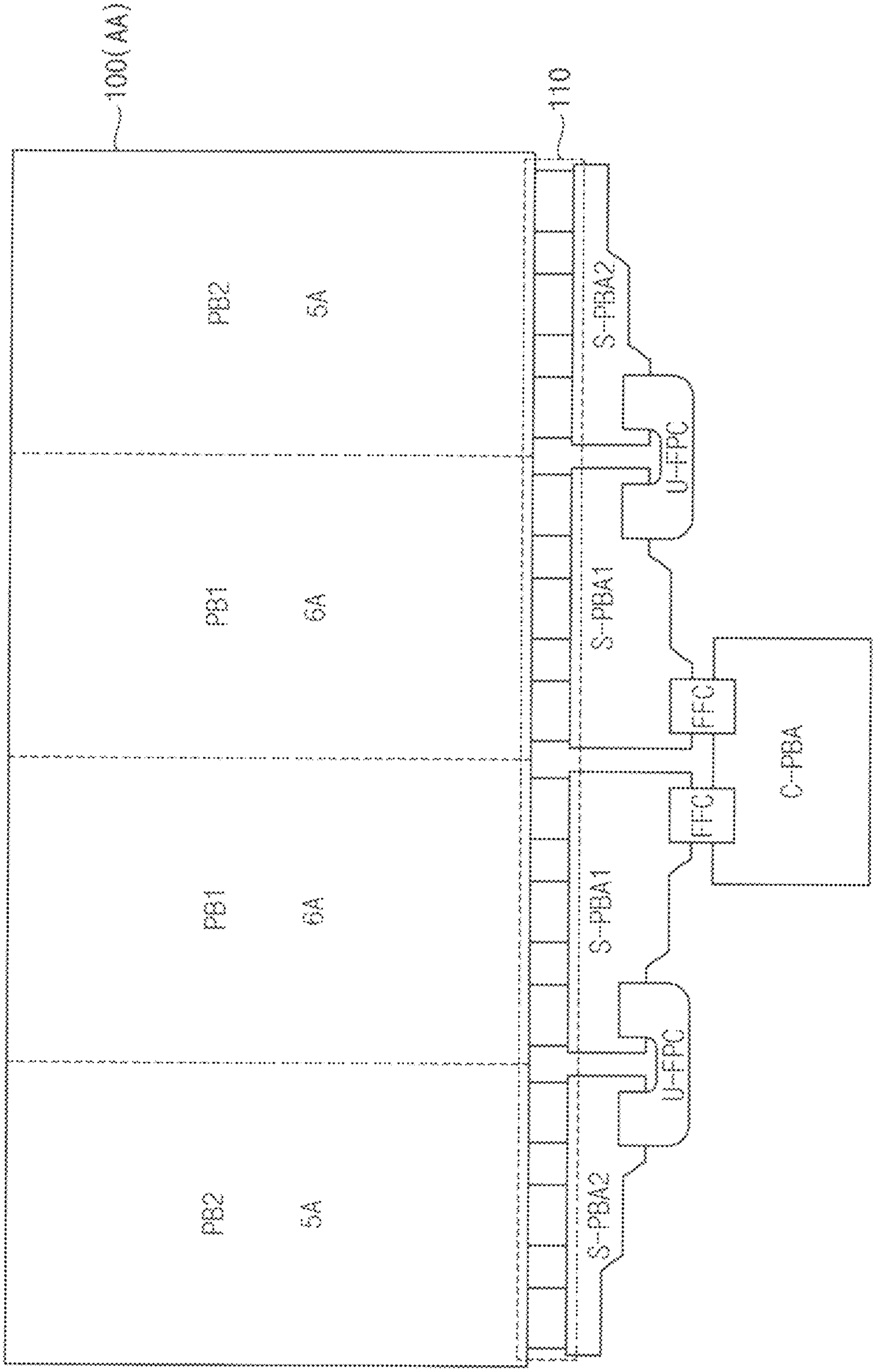
Figure 14C:
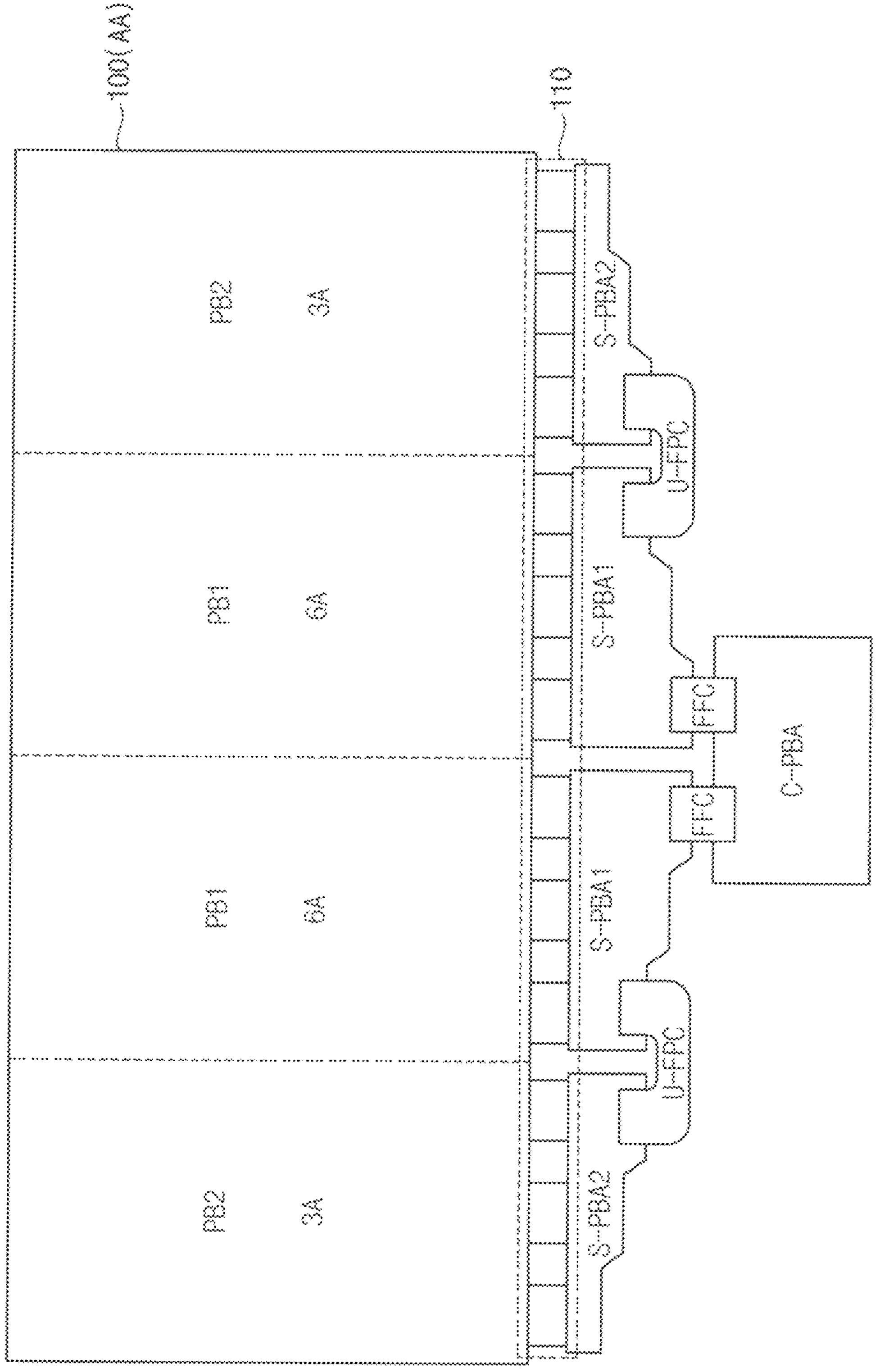

FIG. 13 is a block diagram illustrating an example of a timing controller of a display device according to embodiments of the present inventive concept. FIGS. 14A to 14C are diagrams illustrating an example in which the display device of FIG. 13 corrects input image data IMG.

The display device according to an embodiment described with reference to FIGS. 11, 12, 13 and 14A to 14C is substantially the same as the display device 1000 of FIG. 1, except for the presence of a target gain and gain reduction entry coordinate determiner 242. Thus, for convenience of explanation, the same reference numerals are used to refer to the same or similar elements, and any repetitive explanation will be omitted.

Referring to FIGS. 11, 12, 13, and 14A to 14C, according to embodiments, the target gain and gain reduction entry coordinate determiner 242 does not change the gain reduction region GRR when the reduction current DC is smaller than a reduction current threshold DC_TH, and may change the gain reduction region GRR when the reduction current DC is greater than or equal to the reduction current threshold DC_TH. The target gain and gain reduction entry coordinate determiner 242 may determine the target gain TG regardless of the reduction current threshold DC_TH. Accordingly, the display device may adjust only the target gain TG when the reduction current DC is not large, and may adjust both the target gain TG and the gain reduction region GRR when the reduction current DC is large. The reduction current threshold DC_TH may be a value set by a user.

FIGS. 14A to 14C illustrate that the same grayscale value is displayed in all pixels P (e.g., the full white image), and a sum of the predicted power currents PEL for the entire display panel 100 is 24 A (e.g., it is assumed that a sum of the power currents flowing through the display panel 100 is 24 A when the power current is not adjusted). FIG. 14A illustrates that the reduction current DC is zero or negative (e.g., when the predicted power current PEL is less than or equal to the maximum allowable power current AEL), FIG. 14B illustrate that the reduction current DC is greater than zero (e.g., when the predicted power current PEL is greater than the maximum allowable power current AEL) and smaller than the reduction current threshold DC_TH, and FIG. 14C illustrate that the reduction current DC is greater than the reduction current threshold DC_TH.

For example, in the case of FIG. 14A, a current of 6 A may flow through the first panel blocks PB1 and the second panel blocks PB2. That is, the same power current may flow through the first panel blocks PB1 and the second panel blocks PB2.

For example, in the case of FIG. 14B, a current of 6 A may flow through the first panel blocks PB1 and a current of 5 A may flow through the second panel blocks PB2. That is, the power current adjusted according to the target gain TG may flow through the second panel blocks PB2.

For example, in the case of FIG. 14C, a current of 6 A may flow through the first panel blocks PB1 and a current of 3 A may flow through the second panel blocks PB2. That is, as the gain reduction region GRR and the target gain TG are changed, the power current flowing through the second panel blocks PB2 may also be adjusted.

Figure 15:
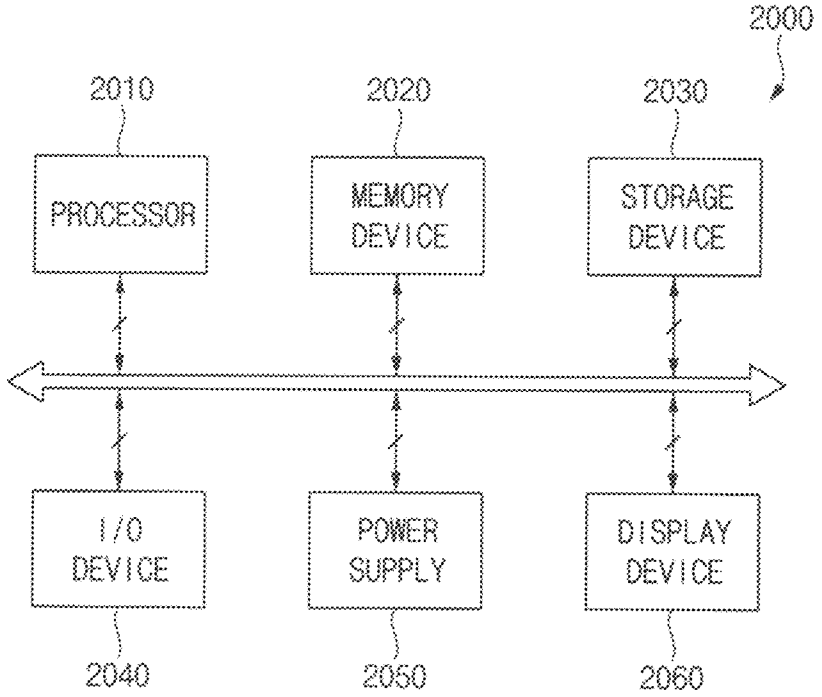
FIG. 15 is a block diagram showing an electronic device according to embodiments of the present inventive concept.
Figure 16:
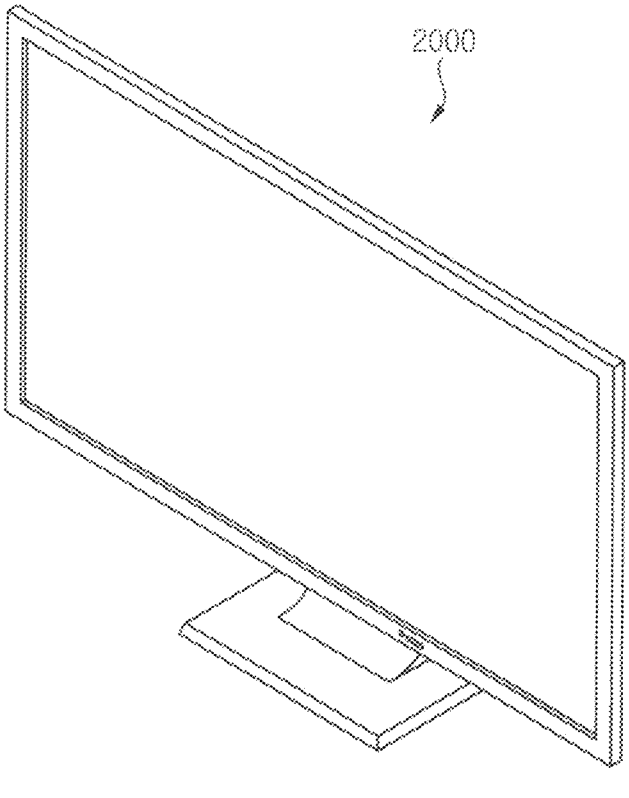
FIG. 16 is a diagram showing an example in which the electronic device of FIG. 15 is implemented as a television.

FIG. 15 is a block diagram showing an electronic device according to embodiments of the present inventive concept. FIG. 16 is a diagram showing an example in which the electronic device of FIG. 15 is implemented as a television.

Referring to FIGS. 15 and 16, the electronic device 2000 includes a processor 2010, a memory device 2020, a storage device 2030, an input/output (I/O) device 2040, a power supply 2050, and a display device 2060. Here, the display device 2060 may be the display device 1000 of FIG. 1. In addition, the electronic device 2000 may further include a plurality of ports for communicating with, for example, a video card, a sound card, a memory card, a universal serial bus (USB) device, other electronic devices, etc. In an embodiment, as shown in FIG. 16, the electronic device 2000 may be implemented as a television. However, the electronic device 2000 is not limited thereto. For example, the electronic device 2000 may be implemented as a cellular phone, a smartphone, a smart pad, a smartwatch, a tablet PC, a car navigation system, a computer monitor, a laptop, a head mounted display (HMD) device, etc.

The processor 2010 may perform various computing functions. The processor 2010 may be, for example, a microprocessor, a central processing unit (CPU), an application processor (AP), etc. The processor 2010 may be coupled to other components via, for example, an address bus, a control bus, a data bus, etc. Further, the processor 2010 may be coupled to an extended bus such as a peripheral component interconnection (PCI) bus.

The memory device 2020 may store data for operations of the electronic device 2000. For example, the memory device 2020 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, etc., and/or at least one volatile memory device such as a dynamic random access memory (DRAM) device, a static random access memory (SRAM) device, a mobile DRAM device, etc.

The storage device 2030 may include, for example, a solid state drive (SSD) device, a hard disk drive (HDD) device, a CD-ROM device, etc.

The I/O device 2040 may include an input device such as, for example, a keyboard, a keypad, a mouse device, a touch pad, a touch screen, etc., and an output device such as, for example, a printer, a speaker, etc. In some embodiments, the I/O device 2040 may include the display device 2060.

The power supply 2050 may provide power for operations of the electronic device 2000. For example, the power supply 2050 may be a power management integrated circuit (PMIC).

The display device 2060 may display an image corresponding to visual information of the electronic device 2000. For example, the display device 2060 may be an organic light emitting display device or a quantum dot light emitting display device, but is not limited thereto. The display device 2060 may be coupled to other components via the buses or other communication links. Here, the display device 2060 may reduce the power current flowing through the flexible printed circuit board and may include the flexible printed circuit board including the small number of pins. The display device may reduce a size of the flexible printed circuit board by reducing the number of pins of the flexible printed circuit board. Accordingly, manufacturing cost of the flexible printed circuit board may be reduced. In addition, the display device may include a reduced number of pins of the flexible printed circuit board, and thus, a yield of the flexible printed circuit board and the display device may be increased.

Embodiments of the inventive concept may be applied to any electronic device including the display device. For example, embodiments of the inventive concept may be applied to a television (TV), a digital TV, a 3D TV, a mobile phone, a smartphone, a tablet computer, a virtual reality (VR) device, a wearable electronic device, a personal computer (PC), a home appliance, a laptop computer, a personal digital assistant (PDA), a portable multimedia player (PMP), a digital camera, a music player, a portable game console, a navigation device, etc.

In some situations, a static image such as a logo of an image producer, a logo of a broadcaster, etc. is displayed in a corner of a display panel. Since the logo is continuously displayed, an afterimage may be unintentionally formed on the display panel due to the logo remaining in the corner.

As is traditional in the field of the present inventive concept, embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, etc., which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions.

Referring to a display device according to a comparative example, luminance of the display panel may be adjusted according to the load of input image data, which may prevent damage to the data driver or the display panel due to excessive current flowing into the data driver or the display panel. However, when the input image data includes a locally bright part, luminance control of the display panel may not be applied. Accordingly, referring to the comparative example, there may be an increase in the number of pins of a flexible printed circuit board connecting source printed circuit boards on which the data driver is integrated, and a size of the flexible printed circuit boards may increase.

As described above, a display device according to embodiments of the inventive concept may determine the target gain according to the maximum allowable power current of the flexible printed circuit board. Accordingly, the display device may reduce a power current flowing through the flexible printed circuit board and may provide a flexible printed circuit board including a small number of pins.

While the present inventive concept has been particularly shown and described with reference to embodiments thereof, it will be understood by those of ordinary skill in the art that various changes in form and detail may be made therein without departing from the spirit and scope of the present inventive concept as defined by the following claims.

What is claimed is:

1. A display device, comprising:

a control printed circuit board;

a first source printed circuit board connected to the control printed circuit board through a cable;

a second source printed circuit board connected to the first source printed circuit board through a flexible printed circuit board;

a display panel including a plurality of pixels and connected to the first source printed circuit board and the second source printed circuit board through a connection part; and a timing controller integrated in the control printed circuit board, and configured to determine predicted power currents based on input image data, to determine a target gain based on the predicted power currents and a maximum allowable power current of the flexible printed circuit board, and to correct the input image data corresponding to a gain reduction region of the display panel based on the target gain, wherein the maximum allowable power current is a maximum current value that flows in the flexible printed circuit board.

2. The display device of claim 1, wherein the display panel includes first blocks connected to the first source printed circuit board and second blocks connected to the second source printed circuit board, and wherein the timing controller is configured to determine the predicted power currents for the second blocks based on a reference power current and block loads of the input image data corresponding to the second blocks.

3. The display device of claim 2, wherein each of the predicted power currents for the second blocks is determined by a product of the reference power current and each of the block loads of the input image data corresponding to the second blocks.

4. The display device of claim 2, wherein the timing controller calculates a reduction current by subtracting the maximum allowable power current from a maximum value among the predicted power currents for the second blocks, and wherein the target gain decreases as the reduction current increases.

5. The display device of claim 2, wherein the gain reduction region is a region disposed away from a central coordinate of the display panel based on gain reduction entry coordinates of the display panel.

6. The display device of claim 5, wherein the timing controller is configured to change the gain reduction region based on the predicted power currents and the maximum allowable power current.

7. The display device of claim 6, wherein the timing controller is configured to calculate a reduction current by subtracting the maximum allowable power current from a maximum value among the predicted power currents for the second blocks, and wherein the gain reduction entry coordinates become closer to the central coordinate of the display panel as the reduction current increases.

8. The display device of claim 7, wherein the timing controller is configured to not change the gain reduction region when the reduction current is less than a reduction current threshold, and to change the gain reduction region when the reduction current is greater than or equal to the reduction current threshold.

9. The display device of claim 1, wherein the timing controller is configured to correct the input image data by applying a gain to the input image data, and wherein the gain decreases as a coordinate to which the gain is applied in the gain reduction region is disposed away from a central coordinate of the display panel, and converges to the target gain.

10. The display device of claim 9, wherein the gain is constant outside of the gain reduction region.

11. The display device of claim 9, wherein the target gain decreases as an amount of motion of the input image data increases.

12. The display device of claim 9, wherein the target gain increases as a load of the input image data increases.

13. A display device, comprising:

a control printed circuit board;

a first source printed circuit board connected to the control printed circuit board through a cable;

a second source printed circuit board connected to the first source printed circuit board through a flexible printed circuit board;

a display panel including a plurality of pixels and connected to the first source printed circuit board and the second source printed circuit board through a connection part; and a timing controller integrated in the control printed circuit board, and configured to determine predicted power currents based on input image data, to change a gain reduction region of the display panel based on the predicted power currents and a maximum allowable power current of the flexible printed circuit board, to determine a target gain based on an amount of motion of the input image data and a load of the input image data, and to correct the input image data corresponding to the gain reduction region based on the target gain.

14. The display device of claim 13, wherein the gain reduction region is a region disposed away from a central coordinate of the display panel based on gain reduction entry coordinates of the display panel.

15. The display device of claim 14, wherein the display panel includes first blocks connected to the first source printed circuit board and second blocks connected to the second source printed circuit board, and wherein the timing controller is configured to determine the predicted power currents for the second blocks based on a reference power current and block loads of the input image data corresponding to the second blocks.

16. The display device of claim 15, wherein each of the predicted power currents for the second blocks is determined by a product of the reference power current and each of the block loads of the input image data corresponding to the second blocks.

17. The display device of claim 15, wherein the timing controller calculates a reduction current by subtracting the maximum allowable power current from a maximum value among the predicted power currents for the second blocks, and wherein the gain reduction entry coordinates become closer to the central coordinate of the display panel as the reduction current increases.

18. The display device of claim 13, wherein the timing controller is configured to correct the input image data by applying a gain to the input image data, and wherein the gain decreases as a coordinate to which the gain is applied in the gain reduction region is disposed away from a central coordinate of the display panel, and converges to the target gain.

19. The display device of claim 18, wherein the gain is constant outside of the gain reduction region.

20. The display device of claim 18, wherein the target gain decreases as the amount of motion of the input image data increases, and wherein the target gain increases as the load of the input image data increases.

* * * * *